United States Patent [19]

Loy et al.

[11] Patent Number: 5,545,675
[45] Date of Patent: Aug. 13, 1996

[54] PROCESS FOR THE PREPARATION OF POLYESTER-POLYURETHANE FLEXIBLE FOAMS WHICH DO NOT GIVE RISE TO THE FORMATION OF MISTING AND USE OF THE SAID FOAMS

[75] Inventors: Jean-Philippe Loy, Bourgtheroulde-Infreville; Denis Ghesquiere, Tourville la Campagne; Line Fiquet, Rouen, all of France

[73] Assignee: Witco, Paris, France

[21] Appl. No.: 386,083

[22] Filed: Feb. 9, 1995

[30] Foreign Application Priority Data

Dec. 28, 1994 [FR] France .................................. 94 15776

[51] Int. Cl.$^6$ ...................................................... C08G 18/34
[52] U.S. Cl. ............................................. 521/172; 528/83
[58] Field of Search ................................ 521/172; 528/83

[56] References Cited

FOREIGN PATENT DOCUMENTS

| | | |
|---|---|---|
| 0579988 | 1/1994 | European Pat. Off. . |
| 0601470 | 6/1994 | European Pat. Off. . |
| 0628583 | 12/1994 | European Pat. Off. . |
| 4133306 | 4/1992 | Germany . |

*Primary Examiner*—Morton Foelak
*Attorney, Agent, or Firm*—Young & Thompson

[57] ABSTRACT

Process for the preparation of polyester-polyurethane flexible foams which do not give rise to the formation of misting, in which at least one polyisocyanate is reacted with at least one polyester pretreated by distillation and water and/or highly volatile organic compounds as blowing agent, characterized in that, in order to obtain the pretreated polyester which is used in the reaction with the polyisocyanate, in a first stage a starting polyester is manufactured which has a hydroxyl value (HV) higher by 4 to 12 mg KOH/g in relation to the HV of the desired pretreated polyester and which has a viscosity, measured at 25° C. with a Brookfield RVT viscometer, lower by 2 to 5 Pa s in relation to that of the desired pretreated polyester and, in a second stage, the said starting polyester is subjected to a distillation for a treatment period of between 2 and 300 seconds, in temperature and pressure conditions making it possible to extract at least 85% of the cyclic diester present in the starting polyester.

7 Claims, No Drawings

PROCESS FOR THE PREPARATION OF POLYESTER-POLYURETHANE FLEXIBLE FOAMS WHICH DO NOT GIVE RISE TO THE FORMATION OF MISTING AND USE OF THE SAID FOAMS

This present invention relates to a process for the preparation of polyester-polyurethane flexible foams which do not give rise to the formation of misting or "fogging" and to their use in means of transport, preferably motor vehicles.

In the transportation industry, in particular in the motor vehicle industry, it is known to employ polyurethane foams of polyester-polyurethane type, which are obtained by reacting a polyisocyanate with a polyester containing at least two hydroxyl groups, in the presence of a blowing agent.

In the transportation industry these foams are generally employed inside vehicles, in particular in laminated form as backing, using flame treatment, on trim fabrics, to prevent their creasing; they can also be used to produce some solid components, such as armrests, headrests and sun visors. The particular mechanical and adhesive properties of this type of foam are not encountered in the case of another type of foam which is commonly employed: the polyether-polyurethane foams, and this makes their use preferable. However, it is known that polyester-polyurethane foams give rise to a phenomenon of mist formation on windscreens, generally called "fogging". This phenomenon is, for example, described by W. Behrens, T. Lampe and P. Schwarz in Automobiltechische Zeitschrift 93, 1991, No. 7/8, pages 384 to 389 (part 1) and 1991, No. 11 (part 2); it arises from the evaporation of volatile products which are present in the foam and which condense on the cold wall consisting of the windscreen. This produces a deposit which scatters light and which is inconvenient for the driver, in particular in poor lighting conditions.

From the paper by J. Soler et al., Polyurethanes World Congress 1993, pages 552–557 it is also known that the "fogging" in the polyester-polyurethane foams is due essentially to the presence of lactones which are already present in the polyester-polyol; these lactones do not react with the isocyanate and therefore remain as such in the foam.

In the case where the polyester employed is a poly(diethylene glycol adipate) the lactone responsible for the "fogging" is 1,4,7-trioxacyclotridecane-8,13-dione, which is a cyclic diester of formula I:

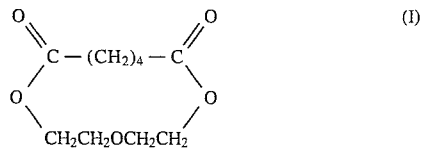

Poly(diethylene glycol adipate), conventionally employed for the manufacture of foams and manufactured by the technique of bulk polycondensation in inert atmosphere in the presence of a polyol which has a functionality higher than 2, such as trimethylolpropane, as branching agent, contains of the order of 0.9 to 1.2% by weight of the cyclic diester of formula I. Cyclic esters of higher degree of polymerization are also present, but in much smaller quantities, and make practically no contribution to the formation of "fogging" because their molecular mass is high. When a polyurethane foam is tested according to DIN Standard 75 201 B, it is considered that the "fogging" phenomenon has disappeared if the measurement obtained is lower than 0.2 mg.

Attempts have therefore been made to remove the lactones responsible for the "fogging" phenomenon before the reaction of the polyesters with polyisocyanates. Thought has been given to employing distillation, because the cyclic diesters are more volatile than the linear polyesters. However, a problem arises because the cyclic diesters and the oligoesters are in thermodynamic equilibrim. Consequently, as the cyclic diesters are being removed from the mixture, they tend to be re-formed from oligoesters to reestablish the equilibrium (see, in this connection, A. A. Guryliva et al., Polymer Science USSR, 1979, Volume 21, No. 7, pages 1745 to 1753); it is known, furthermore, that cyclic esters can be obtained in a high yield by distillation of linear polyesters at high temperature and reduced pressure (Spanagel and Carothers, J. Am. Chem. Soc., 1935, 57, pages 929–34). To avoid a shift of the equilibrium towards the cyclic diesters it is therefore necessary to limit the residence time at high temperature in order to avoid re-formation of the lactones after their removal. To this end it is known to employ a thin-layer or film evaporation or flash distillation; distillation of this type is well known in the polymer industry: for example in J. Polymer Sci. Reviews, 1977, Vol. 12, pages 79 to 105, there is a description of the removal under vacuum, in a film evaporator, of cyclic oligomers in a nylon-6 melt obtained by polymerization of caprolactams and, in Ind. Eng. Chem. Fundam, 1980, 19, pages 415–420, there is a description of the use of a swept-film evaporator for the removal of the volatiles from the polymers.

Furthermore, EP-A-579 988 describes a process in which the "fogging" of a polyester-polyurethane foam is reduced by subjecting the polyester, before it is employed for the production of foam, to a distillation with a mean residence time of between 2 and 600 s, at a temperature of between 160° and 250° C. at a pressure of 0.05 to 10 mbar. According to this process a commercially available conventional polyester such as Desmophen 2200®, marketed by Bayer AG, is treated by distillation and, in order to obtain the short distillation period required, a falling-film evaporator, a thin-film evaporator or a flash evaporator is employed.

The process described in EP-A-579 988, while making it possible to remove a part of the agents responsible for the "fogging" originating from the polyester, nevertheless has the disadvantage of allowing it to be removed only very incompletely; moreover, this removal cannot be more complete because a more radical extraction would require the use of higher temperatures or longer residence times and would result in a polyester whose physicochemical properties would no longer be those required for the production of the desired polyurethane foams in the usual conditions.

In the processes currently used for the manufacture of polyester-polyurethane foams use is generally made of polyesters which have a molecular mass of between 400 and 6 000, preferably between 1 000 and 4 000, more preferably between 2 200 and 2 800, and which have a hydroxyl value (HIV) of between 40±2 and 70±2 mg KOH/g and a viscosity of between 10 and 30 Pa s, preferably between 15 and 25 Pa s, measured at 25° C. with the aid of a Brookfield RVT viscometer. These polyesters contain at least 2 OH groups per molecule, preferably 2 to 4 OH groups.

According to the present invention a process for pretreatment of the polyesters has been found which makes it possible to overcome the disadvantage, described above, of the process defined in EP-A-579 988 and which makes it possible to reach "fogging" measurements according to DIN Standard 75 201 B which are very markedly lower, of the order of 0.1 mg.

The subject of the present invention is therefore a process for the preparation of polyester-polyurethane flexible foams which do not give rise to the formation of misting or "fogging" originating from the polyester, in which:

a) at least one polyisocyanate is reacted with b) at least one polyester pretreated by distillation with a short residence time, this polyester containing at least two hydroxyl groups per molecule and having a molecular mass of between 400 and 10 000, c) water and/or highly volatile organic compounds as blowing agent, optionally in the presence of one or more compound(s) containing at least two active hydrogen atoms, which have molecular masses of between 32 and 400, as chain-extending and crosslinking agent(s) and, optionally, in the presence of at least one additive known per se, characterized in that, in order to obtain the pretreated polyester which is used in the reaction with the polyisocyanate, in a first stage, a starting polyester is manufactured which has a hydroxyl value (HV) higher by 4 to 12 mg KOH/g in relation to the HV of the desired pretreated polyester and which has a viscosity, measured at 25° C. with a Brookfield RVT viscometer, lower by 2 to 5 Pa s in relation to that of the desired pretreated polyester and, in a second stage, the said starting polyester is subjected to a distillation for a treatment period of between 2 and 300 seconds, in temperature and pressure conditions making it possible to extract at least 85% of the cyclic diester present in the starting polyester.

Bearing in mind industrial equipment currently available, the distillation in the second stage may advantageously be performed:

either at a pressure of between 0.1 and 5 pascals at a temperature of between 100° and 130° C. (molecular distillation);

or at a pressure of between 50 and 200 pascals at a temperature of between 250° and 310° C. (thin-film evaporator).

According to the present invention it has therefore been found that, by modifying the physicochemical characteristics of the polyester subjected to distillation without modifying its chemical nature, it is possible to obtain after distillation, on the one hand, a polyester from which the volatile products generating misting or "fogging" have been practically completely removed and, on the other hand, a polyester which has the qualities required for manufacturing a polyester-polyurethane foam without having to modify the normal conditions of the conventional processes for foam manufacture.

The starting polyester is preferably a poly(diethylene glycol adipate) preferably containing a branching agent such as trimethylolpropane, glycerol or pentaerythritol. It has been found that, in this case, a pretreated polyester containing less than 0.1% by weight of cyclic diester of formula I can be obtained. It should be noted that in the poly(diethylene glycol adipate) pretreated by distillation according to the invention most of the free diethylene glycol initially present in the starting polyester is also removed, because diethylene glycol distils before the diester of formula I. This removal presents no major disadvantage; furthermore, the diethylene glycol may be optionally reintroduced, completely or partly.

The starting polyester is advantageously prepared, in conventional manner, by bulk polycondensation of at least one diacid and at least one diol, optionally used in combination with a small quantity of polyol, at a temperature of between 160° and 250° C., preferably under a stream of inert gas, in particular nitrogen, in the presence of an appropriate metallic or organometallic catalyst. A person skilled in the art given the definition of the raw material and the physical characteristics of the polyester to be obtained is capable of determining the specific parameters of such a manufacture.

The distillation applied to the starting polyester may be a thin-film evaporation using the molecular distillation technique. It is possible, in this process, to employ an apparatus consisting of a vessel in which a vacuum is produced by a system enabling pressures of 0.1 pascal to be reached. The product to be treated is delivered continuously onto the middle of a disc placed in this vessel. This disc rotates at high speed; the centrifugal force applied to the product produces a film. The lower face of the disc is heated either by electrical resistances or by induction. The action of the vacuum and of the thermal power transmitted to the film give rise to evaporation. The entities removed are condensed on the dome of the vessel and are recovered in a receptacle which is heated if need be. The product which has been rid of its volatiles leaves the disc to be collected. In the particular case the polyester is predegassed at 70°–80° C. at 50 pascals to be capable of reaching a sufficient vacuum in the molecular still vessel. The resin is next injected in the middle of a disc of 38 cm diameter rotating at 1 500 rev/min. The distillation takes place at a pressure of between 0.1 and 5 pascals, at a temperature of between 100° and 130° C.

The distillation may also be performed in a swept thin-film evaporator. In a known manner, an evaporator of this type is made up essentially of a cylindrical part heated by a jacket, an upper part used for separating the volatiles and a rotor rotating at high speed. The product to be treated is introduced in the upper part of the jacket and is distributed uniformly on the heating surface by a distribution ring; it is picked up again by the rotor blades and instantly spread over the whole wall in the form of a film with high turbulence. The product descends towards the base of the evaporator, following a helical motion along the inner wall. The volatile products which are released rise countercurrentwise and pass through a separator at the head of the evaporator. In this case the distillation is performed at a temperature of between 250° and 310° C., at a pressure of between 20 and 300 pascals.

On leaving the distillation apparatus the pretreated polyester is quickly cooled to a temperature lower than or equal to 130° C.

The foam may be prepared by any conventional process known to a person skilled in the art, by reacting an oligo-isocyanate and the pretreated polyester, by itself or mixed with other usual reactive agents such as polycaprolactones and polyamides, in the presence of a catalyst and of a blowing agent and, optionally, in the presence of a crosslinking agent or a chain extender and/or of other known additives.

The polyisocyanate employed may be an aromatic, aliphatic, cycloaliphatic or heterocyclic isocyanate. Polyisocyanates which are easily available technically are generally preferred, such as 2,4- and 2,6-tolylene diisocyanates (TDI) and their mixtures, diphenylmethane diisocyanates (MDI) or the prepolymers resulting from the partial reaction of polyisocyanates with a hydroxyl compound, such as those described in the work by J. H. Saunders, K. C. Frisch, High Polymers, 1964, Vol. 26, "Polyurethanes Chemistry and Technology", published by Interscience Publishers.

Crosslinking or chain-extending agents containing at least two hydrogen atoms capable of reacting with isocyanates, which have a molecular mass lower than 500 may be added to the reaction mixture. These crosslinking agents are, for example, compounds containing hydroxyl and/or amino and/or carboxyl groups.

Water, optionally mixed with a surface-active agent and/or organic compounds of low melting point may be employed as blowing agent.

The preparation of polyurethane foams is described in detail in G. Woods, 1982, "Flexible Polyurethane Foams: Chemistry and Technology", published by Applied Science Publishers.

Other additives may also be introduced in a known manner, such as emulsifying agents, foam-stabilizing agents or flame retardants, pigments, dyes or fillers, stabilizers against aging, or substances which have a fungistatic and bacteriostatic action. Among these compounds, those preferably chosen will be ones which do not themselves cause "fogging" to form.

A further subject of the present invention is the use of polyester-polyurethane flexible foams not producing any "fogging" and capable of being obtained by the process according to the invention, in means of transportation, in particular the interiors of vehicles.

The examples given below by way of illustration and without limitation being implied will allow the invention to be better understood.

EXAMPLES 1 and 2

I-Preparation of the starting polyester

A) Preparation of a first starting polyester (PDIA) (Example 1)

Diethylene glycol, trimethylolpropane and adipic acid are charged in succession in the following proportions per 100 kg of polyester into an esterification reactor fitted with a fractionating column:

| | |
|---|---|
| diethylene glycol (DEG) | 47.74 kg |
| trimethylolpropane (TMP) | 4.06 kg |
| adipic acid | 63.91 kg |

The materials are heated under nitrogen atmosphere and stirred as soon as possible. A temperature plateau is maintained at about 140°–150° C. in order to distil most of the water generated while simultaneously limiting the entrainment of the monomers.

4 g of the catalyst Fomrez SUL 11A from Witco are introduced and heating is continued progressively to a temperature of 220° to 230° C.

The acid and hydroxyl values (AV and HV) are measured at regular intervals in order, if need be, to add monomers to compensate the losses by entrainment.

The reaction is continued until an acid value (AV) lower than 1.5 mg KOH/g and a predetermined hydroxyl value (HV) of 65 to 70 mg KOH/g are obtained.

The total reaction time is approximately 22 hours. The nitrogen flow rate is increased as a function of the progress of the reaction until it finally reaches 0.8 m³/h.

The characteristics of the PDIA polyester obtained are given in Table 1 below.

B) Preparation of a second starting polyester (PDIB) (Example 2)

The procedure is as for the first starting polyester, except that an attempt is made to obtain a hydroxyl value (HV) of between 57 and 62 mg KOH/g.

The following compounds were reacted per 100 kg of polyester:

| | |
|---|---|
| diethylene glycol (DEG) | 48.71 kg |
| trimethylolpropane (TMP) | 2.83 kg |
| adipic acid | 64.25 kg |
| catalyst (the same as for PDIA) | 4 g |

The characteristics of the PDIB polyester obtained are also given in Table 1 below.

TABLE 1

| | PDIA | PDIB |
|---|---|---|
| Functionality | 2.62 | 2.45 |
| Number molecular mass | 2 200 | 2 350 |
| Molar TMP/DEG | 6.3/93.7 | 4.4/95.6 |
| HV (mg KOH/g)* | 67.5 | 59.0 |
| AV (mg KOH/g) | 1.2 | 1.1 |
| Viscosity at 25° C. (mPa s)** | 15 600 | 16 800 |
| Cyclic ester of formula (I) (%) | 1 | 0.95 |
| Free DEG (%) | 0.55 | 0.45 |

TMP = trimethylolpropane
DEG = diethylene glycol
AV = acid value
HV = hydroxyl value
*measured according to NF standard 73272
**measured with a Brookfield RVT viscometer at 25° C.

II-Distillation of the starting polyester

A thin-layer evaporator of Luwa® trademark is employed, which has the following characteristics:

| | |
|---|---|
| Exchange area | 0.125 m² |
| Maximum working temperature | 300–350° C. |
| Minimum working pressure | 10 pascals |
| Peripheral speed at the end of the rotor blades | 8–9 m/s |

The PDIA or PDIB polyesters are preheated, respectively, to 80° C. before being conveyed, at a throughput of 30 kg/h, to the evaporator head by means of a positive displacement pump, the delivery pipe of the pump being heated between 130° and 140° C. using decompressed steam. The pressure in the evaporator is maintained at a value of (150±50) Pa with the aid of a vacuum pump. The evaporator wall is maintained at a temperature of 275° C.±5° C. by circulation of a heat transfer fluid whose temperature is approximately 290° C. The volatile compounds flow into a condenser maintained at a temperature above 80° C. to prevent the condenser from being blocked because of the crystallization of the volatile compounds, in particular of the cyclic diester of formula (I).

The pretreated polyesters (PCIIA and PCIIB obtained respectively from the starting polyesters PDIA and PDIB) leave at the base of the evaporator at a temperature close to that of the evaporator walls. They are immediately cooled to a temperature of 100° C.

The characteristics of the pretreated polyesters obtained are given in Table 2 below:

TABLE 2

| | PCIIA (Example 1) | PCIIB (Example 2) |
|---|---|---|
| HV (mg KOH/g)* | 60.2 | 50.5 |
| AV (mg KOH/g) | 1.3 | 1.1 |
| Viscosity at 25° C. (mPa s)** | 19 500 | 20 400 |
| Cyclic outer of formula (I) (%) | 0.07 | 0.1 |
| Free DEG (%) | Traces | Traces |

HV = hydroxyl value
AV = acid value
DEG = diethylene glycol
*measured according to NF Standard 73272
**measured with a Brookfield RVT viscometer at 25° C.

III-Preparation of the form with the polyester pretreated according to II

The tests were performed according to the known single-stage ("one-shot") process, with the aid of a high-pressure laboratory machine. The mixing head has multiple entries allowing the various components to be introduced in a controlled manner.

4 entry circuits were employed in this example:

1 for the PCIIA or PCIIB polyester prepared according to II of this example;

1 for tolylene diisocyanate TDI (72/28) obtained by 50/50 mixing of TDI 80/20 and of TDI 65/35 (the two numbers indicate the proportion of 2,4-TDI and 2,6-TDI isomers);

1 for the catalyst: N-benzyl-N,N-dimethylamine;

1 for a mixture (water+Fomrez M 6682 A surfactant produced by Witco).

The mixing head was fed while the following proportions were adhered to:

polyester . . . 100 water . . . 3.8 surfactant . . . 1.3 catalyst . . . 1.3 isocyanate . . . q.s . . . value 100

The 100 value of the isocyanate corresponds to the stoichiometric quantity sufficient to react with all the other components which are reactive towards isocyanates.

With the two pretreated polyesters PCIIA and PCIIB (Examples 1 and 2 respectively) a flexible polyurethane foam of 30 kg/m$^3$ density is obtained.

The properties of these foams are given in Table 3 below, in which the standards employed for the measurements are shown:

TABLE 3

| | Example 1 | Example 2 | Standard employed |
|---|---|---|---|
| Density (kg/m$^3$) | 30 | 30 | ASTM D 3574-91, test A |
| IFD (1) in N | | | |
| at 25 % | 270 | | ASTM D 3574-91, test B1 |
| at 50% | 360 | | ASTM D 3574-91, test B1 |
| at 65% | 460 | | ASTM D 3574-91, test B1 |
| Breaking load (kPa) | 120 | | ASTM D 3574-91, test E |
| Elongation at break (%) | 200 | | ASTM D 3574-91, test E |
| Tear resistance (N/m) | 400 | | ASTM D 3574-91, test F |
| Residual compression deformation (%) | 14 | | ASTM D 3574-91, test D |
| Permeability (dm$^3$/s) | 0.21 | | ASTM D 3574-91, test G |
| Number of cells per linear cm | 16 | | |
| Fogging (mg) | <0.1 | 0.1 | DIN 75 201 B |

(1) IFD = Compressive force on a disc of 323 cm$^2$ in a block of foam of 10 cm thickness at different degrees of compression.

EXAMPLE 3

COMPARATIVE

By way of comparison, foams were prepared by the same procedure as that described in Example 1 with the aid of a standard polyester: Fomrez® 60E marketed by Witco, which has the characteristics given in Table 4 below. The process of manufacture was identical with that given above, the only difference being that PCIIA and PCIIB were replaced with Fomrez 60E.

The "fogging" measured using DIN Standard 75 201 B on the foam obtained was 6.5 mg.

TABLE 4

| | FOMREZ 60 E |
|---|---|
| Functionality | 2.67 |
| Number molecular mass | 2 550 |
| TMP/DEG (in moles) | 6.1/93.9 |
| HV (mg KOH/g) | 59.4 |
| AV (mg KOH/g) | 1.35 |
| Viscosity at 25° C., (mPa s) | 21 000 |
| Cyclic ester of formula I (%) | 0.95 |
| Free DEG (%) | 0.5 |

We claim:

1. Process for the preparation of polyester-polyurethane flexible foams which do not give rise to the formation of misting, in which:

a) at least one polyisocyanate is reacted with b) at least one polyester pretreated by distillation with a short residence time, this polyester containing at least two hydroxyl groups per molecule and having a molecular mass of between 400 and 10 000, c) water and/or highly volatile organic compounds as blowing agent, optionally in the presence of one or more compound(s) containing at least two active hydrogen atoms, which have molecular masses of between 32 and 400, as chain-extending and crosslinking agent(s) and, optionally, in the presence of at least one additive known per se, characterized in that, in order to obtain the pretreated polyester which is used in the reaction with the polyisocyanate, in a first stage a starting polyester is manufactured which has a hydroxyl value (HV) higher by 4 to 12 mg KOH/g in relation to the HV of the desired pretreated polyester and which has a viscosity, measured at 25° C. with a Brookfield RVT viscometer, lower by 2 to 5 Pa s in relation to that of the desired pretreated polyester and, in a second stage, the said starting polyester is subjected to a distillation for a treatment period of between 2 and 300 seconds, in temperature and pressure conditions making it possible to extract at least 85% of the cyclic diester present in the starting polyester.

2. Process according to claim 1, characterized in that the distillation in the second stage is performed at a pressure of between 0.1 and 5 pascals at a temperature of between 100° and 130° C. by molecular distillation.

3. Process according to claim 1, characterized in that the distillation in the second stage is performed at a pressure of between 50 and 200 pascals at a temperature of between 250° and 310° C. in a thin-film evaporator.

4. Process according to claim 1, characterized in that the starting polyester is a poly(diethylene glycol adipate).

5. Process according to claim 4, characterized in that the poly(diethylene glycol adipate) contains a branching agent such as trimethylolpropane, glycerol or pentaerythritol.

6. Process according to claim 1, characterized in that the polyester is prepared by bulk polycondensation of at least one diol and at least one acid at temperatures of between 160° and 250° C., in the presence of a catalyst, preferably under a stream of inert gas.

7. Process according to claim 1, characterized in that, after having undergone distillation, the pretreated polyester is quickly cooled to a temperature lower than or equal to 130° C.

* * * * *